United States Patent
Allen et al.

(10) Patent No.: US 8,972,387 B2
(45) Date of Patent: Mar. 3, 2015

(54) SMARTER SEARCH

(75) Inventors: Thomas B. Allen, Henderson, NV (US); Donald A. Bowsher, Jr., Las Vegas, NV (US); Anthony D. Curcio, Monroe, NC (US); Michael H. D'Amico, Las Vegas, NV (US); Brian E. Macy, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/193,412

(22) Filed: Jul. 28, 2011

(65) Prior Publication Data
US 2013/0031089 A1    Jan. 31, 2013

(51) Int. Cl.
*G06F 17/30* (2006.01)

(52) U.S. Cl.
CPC .................... *G06F 17/30861* (2013.01)
USPC ............. 707/723; 707/749; 707/769

(58) Field of Classification Search
CPC ............ G06F 17/30672; G06F 17/30616; G06F 17/30657; G06F 17/30687; G06F 17/30303; G06F 17/30684; G06F 17/30867
USPC ............. 707/713, 723, 999.003, E17.014, 707/E17.017, 749, 769
See application file for complete search history.

(56) References Cited

U.S. PATENT DOCUMENTS

| | | | |
|---|---|---|---|
| 6,301,584 B1 * | 10/2001 | Ranger | 1/1 |
| 6,311,178 B1 * | 10/2001 | Bi et al. | 707/706 |
| 7,254,570 B2 | 8/2007 | Stickler | |
| 7,912,842 B1 * | 3/2011 | Bayliss | 707/749 |
| 2003/0120651 A1 * | 6/2003 | Bernstein et al. | 707/6 |
| 2004/0205079 A1 * | 10/2004 | Azzam | 707/100 |
| 2006/0294081 A1 * | 12/2006 | Dettinger et al. | 707/3 |
| 2007/0143273 A1 | 6/2007 | Knaus et al. | |
| 2009/0106242 A1 | 4/2009 | McGrew et al. | |
| 2009/0198678 A1 | 8/2009 | Conrad et al. | |

(Continued)

FOREIGN PATENT DOCUMENTS

WO    0065486 A1    11/2000

OTHER PUBLICATIONS

U.S. Appl. No. 11/566,492, filed Dec. 4, 2006, entitled "Determining Boolean Logic and Operator Precedence of Query Conditions", invented by T.B. Allen, K. Caceres, M.H. D'Amico, B.L. Hunt, K.M. Nojima, and M.N. Schwenger, Total 29 pp.

(Continued)

*Primary Examiner* — Shiow-Jy Fan
(74) *Attorney, Agent, or Firm* — Janaki K. Davda; Konrad, Raynes, Davda & Victor LLP

(57) ABSTRACT

Provided are techniques to search for an entity in an entity resolution system. Search input comprising one or more attribute values of one or more attribute types is received. A resolution search is performed to generate a search result set comprising one or more entities and zero or more generic attribute values for generating additional entities. In response to determining that the resolution search generated at least two generic attribute values, one or more query searches are performed for a unique generic group by generic attribute type to identify the additional entities, wherein the unique generic group comprises a subset of the search input and includes at least two generic attribute types; the identified additional entities are combined with the entities in the search result set; and the search result set is returned.

22 Claims, 14 Drawing Sheets

(56) References Cited

U.S. PATENT DOCUMENTS

| | | |
|---|---|---|
| 2010/0017365 A1 | 1/2010 | Chilukuri et al. |
| 2010/0030750 A1 | 2/2010 | Oliver |
| 2010/0161542 A1 | 6/2010 | Caceres |
| 2010/0161566 A1 | 6/2010 | Adair et al. |
| 2010/0161602 A1 | 6/2010 | Caceres |
| 2010/0161603 A1 | 6/2010 | Caceres |
| 2010/0161634 A1 | 6/2010 | Caceres |
| 2011/0047167 A1 | 2/2011 | Caceres |
| 2011/0055191 A1* | 3/2011 | Bain .............................. 707/706 |
| 2012/0078949 A1* | 3/2012 | Allen et al. ................... 707/769 |
| 2012/0089604 A1* | 4/2012 | Hamilton ....................... 707/737 |

OTHER PUBLICATIONS

International Search Report and Written Opinion for PCT/EP2012/062982, Oct. 2, 2012, Total 8 pp.

Papadakis, G., "Efficient Entity Resolution Methods for Heterogeneous Information Spaces", 2011 IEEE, ICDE Workshops 2011, Total 4 pp.

* cited by examiner

FIG. 3

Search Entities
[Search] [Clear] [Reset]
☐ Strict search

Attribute type: [Address ▼] — 320

Street address: 123 Anystreet
City: Anycity
State/Province: CA
Postal code: 90210
Country: USA
— 330

Attribute type: [PP (Passport) ▼] — 340

*Passport value: 987654
Location: US

Search Results — 350
Items per page: [20 ▼]

Enter search criteria above and click 'Search' to find entities and list them here.

310 → ☐ Strict search
Generic Search Terms → Attribute type dropdowns

300

```
*********************************************************
** Combined search system finds results based on generic values
*********************************************************

[7/6/11 10:19:18:046 PDT] 00000029 SystemOut    O Loaded properties: {enableSystemOutLogging=true, search_group=DEFAULT, search_dsrc_code=1589, search_user=user}

[7/6/11 10:19:18:046 PDT] 00000029 SystemOut    O Incoming JSON as Map:[criteria:[{criteriaType:"AddressPart",street1:"123 Anystreet",city:"Anycity",state:"CA",postalCode:"90210",country:"USA"}, {criteriaType:"Number",numberValue:"987654",location:"US",numberTypeCode:"PP"}]][strict:false][depth:FULL]]

[7/6/11 10:19:18:046 PDT] 00000029 SystemOut    O Criterion received: <ADDRESS><ADDR1>123 Anystreet</ADDR1><CITY>Anycity</CITY><STATE>CA</STATE><POSTAL_CODE>90210</POSTAL_CODE><COUNTRY>USA</COUNTRY></ADDRESS>

[7/6/11 10:19:18:046 PDT] 00000029 SystemOut    O Criterion received: <NUMBER><NUM_TYPE>PP</NUM_TYPE><NUM_VALUE>987654</NUM_VALUE><NUM_LOCATION>US</NUM_LOCATION></NUMBER>

[7/6/11 10:19:18:046 PDT] 00000029 SystemOut    O DOB Found=false, DOBRangeFound=false
[7/6/11 10:19:18:046 PDT] 00000029 SystemOut    O RunSearch Result = false for type ATTRIBUTE
[7/6/11 10:19:18:046 PDT] 00000029 SystemOut    O Resolution search approved based on criteria rules.
[7/6/11 10:19:18:046 PDT] 00000029 SystemOut    O RunSearch Result = true for type RESOLUTION
```

```
[7/6/11 10:19:18:046 PDT] 00000029 SystemOut     O Resolution Search UMF: <UMF_PSEARCH><DSRC_CODE>1589</
DSRC_CODE><DSRC_ACCT>1030ca6d:130fc90dd0b:-7ff2</DSRC_ACCT><DSRC_REF>1030ca6d:130fc90dd0b:-7ff2</
DSRC_REF><DSRC_ACTION>A</DSRC_ACTION><FORMAT_CODE>EAS_APP_SEARCH</
FORMAT_CODE><ENTITY_TYPE>SEARCH</ENTITY_TYPE><SEARCH><MIN_LIKE_SCORE>1</
MIN_LIKE_SCORE><SYS_CREATE_US>user</SYS_CREATE_US><SEARCH_GROUP>DEFAULT</
SEARCH_GROUP><REASON_CODE>NULL</REASON_CODE><ADDRESS><ADDR1>123 Anystreet</
ADDR1><CITY>Anycity</CITY><STATE>CA</STATE><POSTAL_CODE>90210</POSTAL_CODE><COUNTRY>USA</
COUNTRY></ADDRESS><NUMBER><NUM_TYPE>PP</NUM_TYPE><NUM_VALUE>987654</
NUM_VALUE></NUM_LOCATION>US</NUM_LOCATION></NUMBER></UMF_PSEARCH>

[7/6/11 10:19:18:296 PDT] 00000029 SystemOut     O Document Received: <?xml version="1.0" encoding="UTF-
8"?><UMF_SEARCH_RESULT><ER_ID>4009</ER_ID><FORMAT_CODE>EAS_APP_SEARCH</
FORMAT_CODE><GENERICS><NUMBER><NUM_TYPE>PP</NUM_TYPE><NUM_VALUE>987654</
NUM_VALUE><NUM_LOCATION>US</NUM_LOCATION><QC_STAT>0</QC_STAT><NUM_TYPE_ID>3</
NUM_TYPE_ID><KEEP_HIST>Y</KEEP_HIST><NUM_STATUS>A</NUM_STATUS><NUM_HASH>456789</
NUM_HASH><NUM_KEY>8765c62056af124230d81e21a5579044</NUM_KEY><GENERIC>1</GENERIC><NUM_ID>3009</
NUM_ID></NUMBER><ADDRESS><ADDR1>123 Anystreet</ADDR1><CITY>Anycity</CITY><STATE>CA</
STATE><POSTAL_CODE>90210</POSTAL_CODE><COUNTRY>USA</COUNTRY><ADDR_TYPE>H</
ADDR_TYPE><QC_STAT>0</QC_STAT><ADDR3></ADDR3><CARE_OF/><ADDR_STAT>V</ADDR_STAT><CLEANSED_STATUS>PARSED</
CLEANSED_STATUS><ADDR2/><ADDR_LEFTOVRS/><STREET_NAME>ANYSTREET</
STREET_NAME><BUILDING_NUM>123</BUILDING_NUM><SEC_UNIT_RANGE/><PO_BOX_NUM/><RRHC_TYPE/
><RRHC_NUM/><RRHC_BOX_NUM/><STATE_CODE/><COUNTRY_CODE/><COUNTRY_CODE3/
><PRE_DIRECTIONAL/><STREET_SUFFIX/><POST_DIRECTIONAL/><SEC_UNIT_TYPE/><LOT_CODE/
><BUILDING_TYPE/><CARRIER_ROUTE/><DPBC/><DELIV_PROB>00</DELIV_PROB><CLEANSED_TYPE>SRD</
CLEANSED_TYPE><LATITUDE/><LONGITUDE/><SUFFIX_FIRST>N</SUFFIX_FIRST><ADDR_HASH>ANYST
123    902</ADDR_HASH><ADDR_KEY>e2796cd9c56bd277923988c1d95cba7f</ADDR_KEY><GENERIC>1</
GENERIC><ADDR_ID>3009</ADDR_ID></ADDRESS></GENERICS><SYS_CREATE_DT>2011-07-06 10:19:18</
SYS_CREATE_DT></UMF_SEARCH_RESULT>
```

FIG. 4B

```
[7/6/11 10:19:18:296 PDT] 00000029 SystemOut     O ResolutionSearchSummary: Resolution Search Summary: ReturnCount=0,ER
ID=4009,SysCreateDate=Wed Jul 06 10:19:18 PDT 2011,isError=false,Generics=<NUMBER><NUM_TYPE>PP</
NUM_TYPE><NUM_VALUE>987654</NUM_VALUE><NUM_LOCATION></NUM_LOCATION></
NUMBER><ADDRESS><ADDR1>123 Anystreet</ADDR1><CITY>Anycity</CITY><STATE>CA</
STATE><POSTAL_CODE>90210</POSTAL_CODE><COUNTRY>USA</COUNTRY></ADDRESS>,Results=
[7/6/11 10:19:18:296 PDT] 00000029 SystemOut     O Generics Returned Count: 2
[7/6/11 10:19:18:296 PDT] 00000029 SystemOut     O Generics searches to run
(1):[<UMF_QUERY><FORMAT_CODE>ENHANCED_QUERY_RESULT</FORMAT_CODE><SYS_CREATE_US>user</
SYS_CREATE_US><ADDRESS><ADDR1>123 Anystreet</ADDR1><CITY>Anycity</CITY><STATE>CA</
STATE><POSTAL_CODE>90210</POSTAL_CODE><COUNTRY>USA</COUNTRY></
ADDRESS><NUMBER><NUM_TYPE>PP</NUM_TYPE><NUM_VALUE>987654</
NUM_VALUE><NUM_LOCATION></NUM_LOCATION></NUMBER></UMF_QUERY>]
[7/6/11 10:19:18:421 PDT] 00000029 SystemOut     O Document Received: <?xml version="1.0" encoding="UTF-
8"?><UMF_QUERY_RESULT><MAX_RETURN_CNT>1000</MAX_RETURN_CNT><RETURN_CNT>1</
RETURN_CNT><ENTITY_RESULT><ENTITY_ID>3006</ENTITY_ID></ENTITY_RESULT><SYS_CREATE_DT>2011-
07-06 10:19:18</SYS_CREATE_DT></UMF_QUERY_RESULT>
[7/6/11 10:19:18:421 PDT] 00000029 SystemOut     O Generics search result: Attribute Search Summary:
MaxReturnCount=1000,ReturnCount=1,SysCreateDate=Wed Jul 06 10:19:18 PDT
2011,isError=false,Results=[3006:EntityID=3006,SearchedName=,matchedName=,nameScore=,matchedNameID=-
1,likenessScore=85.0,searchedUsed=a]
[7/6/11 10:19:18:421 PDT] 00000029 SystemOut     O
entityResults: [
    {
        entityID: "3006",
        nameScore: -1.0,
        rank: 1,
        searchUsed: "a",
        likenessScore: 85.0
    }
]
```

Search Entities — 300

[Search] [Clear] [Reset]

☐ Strict search — 310

Attribute type: Address ▼ — 320

Street address: 123 Anystreet
City: Anycity | State/Province: CA | Postal code: 90210 | Country: USA — 330

Attribute type: PP (Passport) ▼ — 340

*Passport value: 987654 | Location: US — 350

Search Results (1) — 500

1-1 of 1    ⏮ ◀ Page [1] of 1 ▶ ⏭    Items per page: [20] ▼

| Entity ID | Rank | Name Score | Name | Number | Address |
|---|---|---|---|---|---|
| 3006 | 1 | n/a | Somebody, Anthony Michael (1) | DL-1122334455 (2) | 123 Anystreet, Anycity CA 90210 (1) |

510 — Number column; 520 — Address column

SMARTER SEARCH

BACKGROUND

Embodiments of the invention relate to a smarter search for an entity.

Entity resolution techniques may be used to determine when two or more entities (e.g., people, buildings, cars, things, other objects, etc.) represent the same physical entity despite having been described differently. Sometimes these techniques are called de-duplication, match/merge, identity resolution, semantic reconciliation, or have other names. For example, a first record containing CustID#1 [Bob Jones at 123 Main Street with a Date of Birth (DOB) of Jun. 21, 1945] is likely to represent the same entity as a second record containing CustID#2 [Bob K Jones at 123 S. Main Street with a DOB of Jun. 21, 1945]. Entity resolution can be used within a single data source to find duplicates, across data sources to determine how disparate transactions relate to one entity, or used both within and across a plurality of data sources at the same time. In a typical search for an entity in an entity resolution system, records for the entity are returned to the user.

In an entity resolution system, there are two techniques to perform a search for an entity. The first technique is to use the resolution technology to perform the search. The second technique is to use a Structured Query Language (SQL) query to perform the search.

Oftentimes, a user performs multiple searches, using both techniques, to find an entity. Users may search, modify the initial search, search again, etc., while changing search techniques (entity resolution search vs. SQL search) between searches.

SUMMARY

Provided are a method, computer program product, and system to search for an entity in an entity resolution system. Search input comprising one or more attribute values of one or more attribute types is received. A resolution search is performed to generate a search result set comprising one or more entities and zero or more generic attribute values for generating additional entities. It is determined whether the resolution search generated one or more generic attribute values. In response to determining that the resolution search generated zero generic attribute values, the search result set is returned. In response to determining that the resolution search generated at least two generic attribute values, one or more query searches are performed for a unique generic group by generic attribute type to identify the additional entities, wherein the unique generic group comprises a subset of the search input and includes at least two generic attribute types; the identified additional entities are combined with the entities in the search result set; and the search result set is returned.

BRIEF DESCRIPTION OF THE SEVERAL VIEWS OF THE DRAWINGS

Referring now to the drawings in which like reference numbers represent corresponding parts throughout:

FIG. 3 illustrates a search screen in accordance with certain embodiments.

FIGS. 4A, 4B, and 4C illustrate log text for processing performed by the combined search system 110 on the search input provided in FIG. 3 in accordance with certain embodiments.

FIG. 5 illustrates search results in a search screen in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
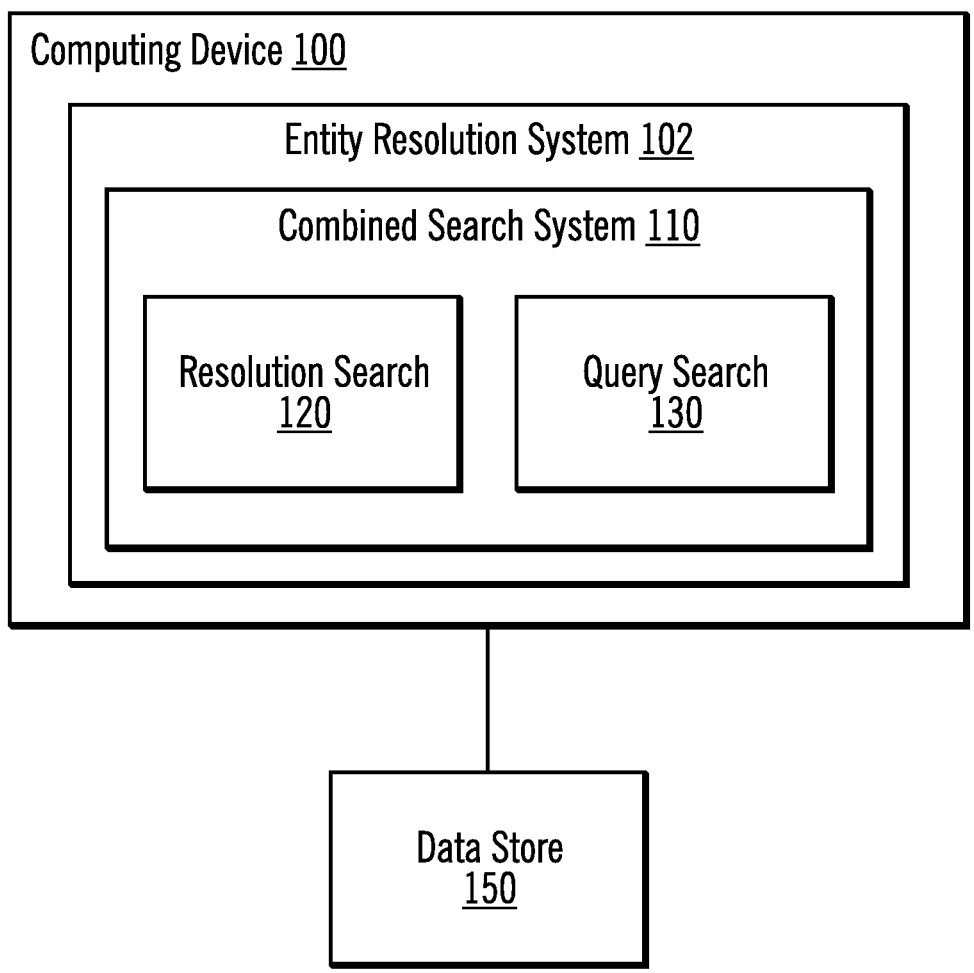
FIG. 1 illustrates, in a block diagram, a computing device in accordance with certain embodiments.

FIG. 1 illustrates, in a block diagram, a computing device 100 in accordance with certain embodiments. The computing device 100 includes an entity resolution system 102. The entity resolution system 102 includes a combined search system 110. The combined search system 110 is able to perform a resolution search 120 and a query search 130 (e.g., a SQL search). The computing device 100 is coupled to a data store 150. In certain embodiments, the data store 150 is a database. The combined search system 110 implements a combination of the resolution search 120 and the query search 130.

Relational databases are computerized information storage and retrieval systems. Relational databases are organized into tables that consist of rows and columns of data. The rows may be called tuples or records or rows. A database typically has many tables, and each table typically has multiple records and multiple columns.

A table in a database can be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

A resolution search 120 is one technique for finding an entity (e.g., one individual). For example, when a customer calls a help desk, a help desk agent may use a resolution search 120 to try and locate the customer in the data store 150.

Entities have features (values that are collected or observed that can be more or less discriminating). For example, in the area of human entities, features may include one or more of: name, address, phone, DOB, Social Security Number (SSN), Driver's License (D/L), biometric features, gender, hair color, and so on. By way of example, SSN's are generally very discriminating, dates of birth are less discriminating, and gender is not particularly discriminating at all. As another example, entity resolution on objects, such as a car, may include one or more features of: license plate number, Vehicle Identification Number (VIN), make, model, year, color, owner, and so on.

Features may be used to establish confidence (a degree of certainty that two discreetly described entities are the same). For the example of CustID#1 and CustID#2, the confirming features of name, address, and DOB and the lack of conflicting features (e.g., features in disagreement, such as opposing D/L numbers) probably result in a high enough confidence to assert that the first record and the second record represent the same entity (e.g., person), without human review.

The resolution search 120 works by first creating candidate keys for key attributes. Candidate keys may be described as locator keys to help find an entity. An example of a candidate key for the name "John Smith" may be "SmithJo". An example of a key for an address of "123 Main St. Anytown Ca 94550" may be "123Main9455ANY". Candidate keys are designed to apply fuzzy matching, as well as, reduce multiple fields to a single field in the data store 150.

The resolution search 120 uses the candidate keys to locate potential exact matches (i.e., candidate entities). That is, the resolution search 120 uses the candidate keys to reduce all the entities in the data store 150 to a small pool of candidate entities. Once the candidate entities are located, the resolution search 120 examines the candidate entities against the search record in a confirmation and scoring phase to see if the search entity matches the candidate.

The resolution search 120 pays attention to the frequencies with which data occurs. To keep the candidate pool size to a manageable size, the resolution search 120 removes over frequent candidate keys. If a user were to perform a search for the name "John Smith" against a data store 150 that had 500 "John Smith" candidate entities, the resolution search 120 would identify "John Smith" as generic and would discard the generic attribute value of "John Smith" from a resolution search 120. Thus, if the user searched for "John Smith", the resolution search 120 would provides zero results, instead of 500. A generic attribute may be described as an attribute with a frequency exceeding a user defined threshold at the entity level. A generic attribute is shared by multiple entities in the entity resolution system 102.

With a resolution search 120, a user enters attribute values to create the candidate keys. In the previous example of creating an address key, the street address and the postal code are needed. If the user were to perform a search by name and postal code, the resolution search 120 may be incapable of creating an address key, and the search might be driven by the name.

The query search 130 performs a search using a query, which is another technique for finding an entity (e.g., one individual). The query search 130 uses a query to locate records in the data store 150. The query search 130 may still create candidate keys from full attribute values (e.g., a name key when a given name and a surname are provided) to still have some fuzzy matching. This would allow the user to better locate some records (e.g., with a name and zip code query). Also, the query search does not remove results based on data frequencies. If a user were to perform a search for the name "John Smith" against a data store 150 that had 500 "John Smith" candidate entities, the query search 130 returns all 500 names. However, if the user added any additional information (e.g., a phone number), query search 130 may miss name and address matches or name and phone number matches.

With query search, the user may have to properly handle the "AND" and "OR" Boolean logic operators in the query. If a user is searching for someone named "John Smith" or "Bob Jones" with a birth date of "Dec. 1, 1970", the user would create the following query:
(name='Bob Jones' OR name='John Smith) AND date of birth='Dec. 1, 1970'

A user can express this as searching for "Bob Jones" and "John Smith" in natural language, but to the query search 130, an "AND" operator is different from an "OR" operator.

With query search, the entity has to match all the data to be returned. If a user was to search on name, address, phone number, and Social Security Number, and the phone number was one digit off, then the match would not be returned.

The combined search system 110 uses resolution search and query search together to create a search that returns better results (i.e., the results the user intended to get). In certain embodiments, the user's intent is assumed to be "find this entity".

The combined search system 110 executes a single search (e.g., from a user or application) that uses both the resolution search 120 and the query search 130. The combined search system 110 provides the ability to run a narrow search, provides all possible search results (i.e., an exhaustive search), allows wild card searches, and provides better results for a single search performed by a user. With the combined search system 110, multiple searches may be avoided by the user. That is, a user may select a search button once to obtain results.

Figure 2A:
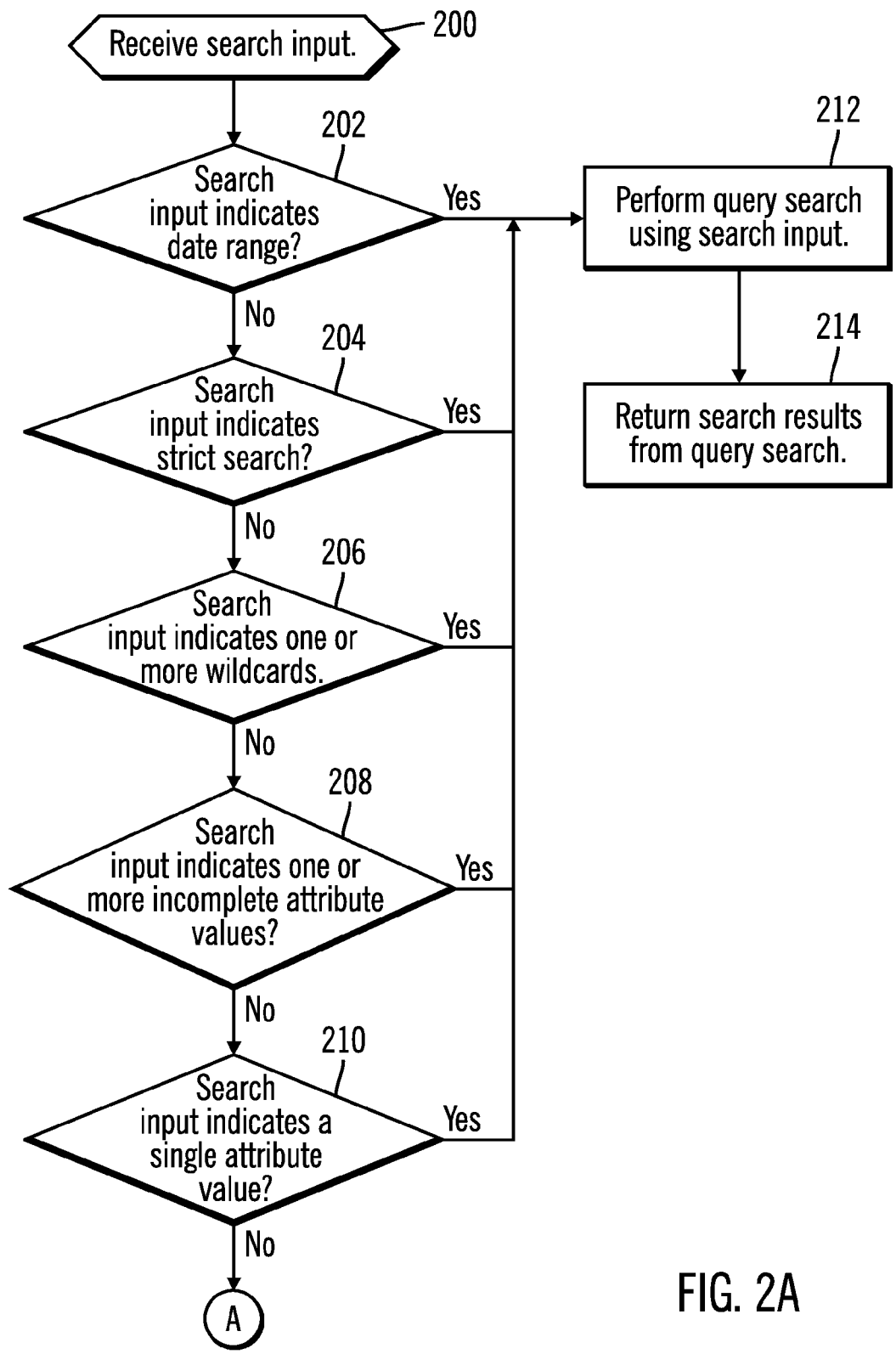
FIGS. 2A, 2B, and 2C illustrate logic, in a flow diagram, for processing search input to generate a search result set.
Figure 2B:
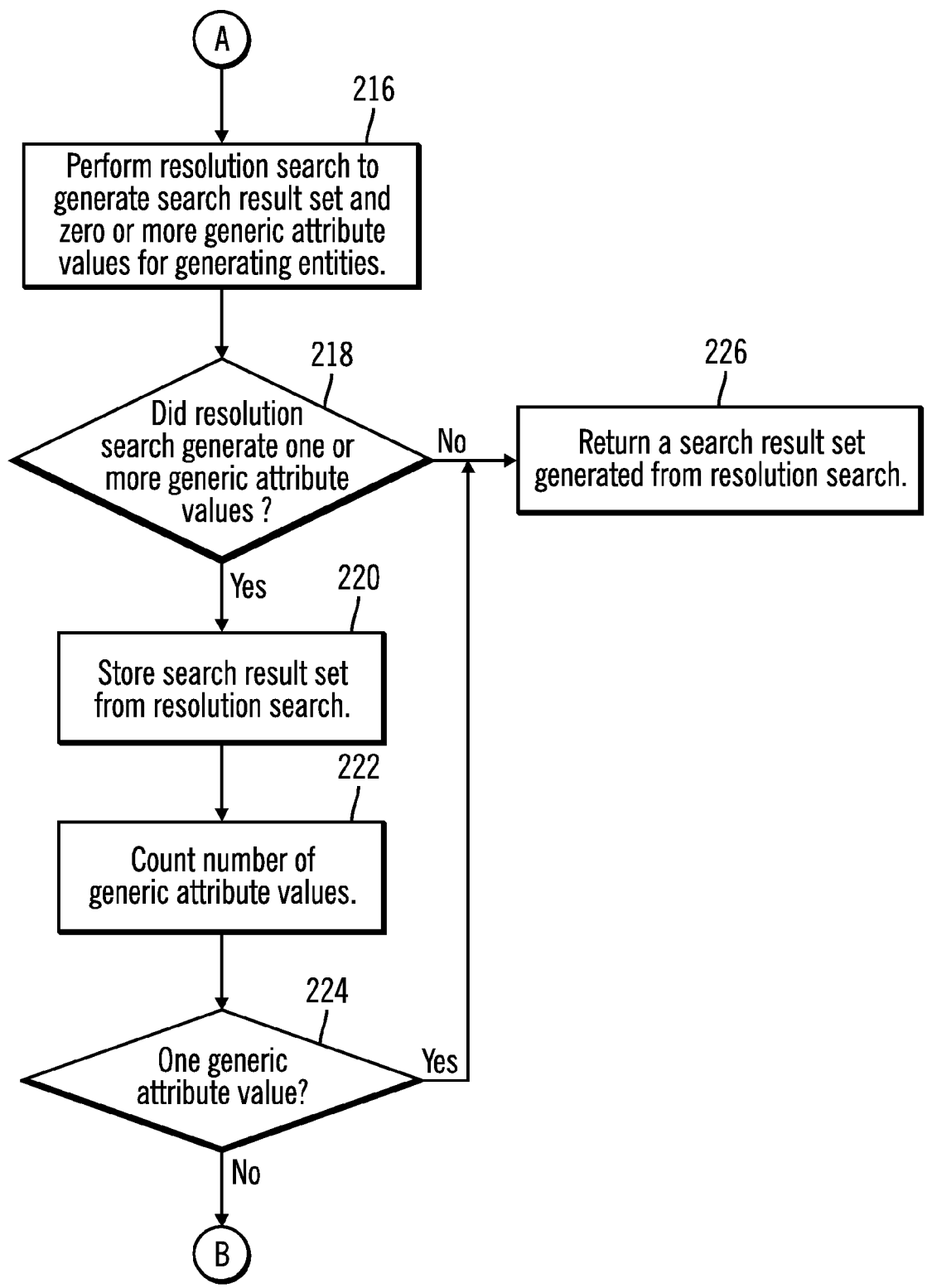
Figure 2C:
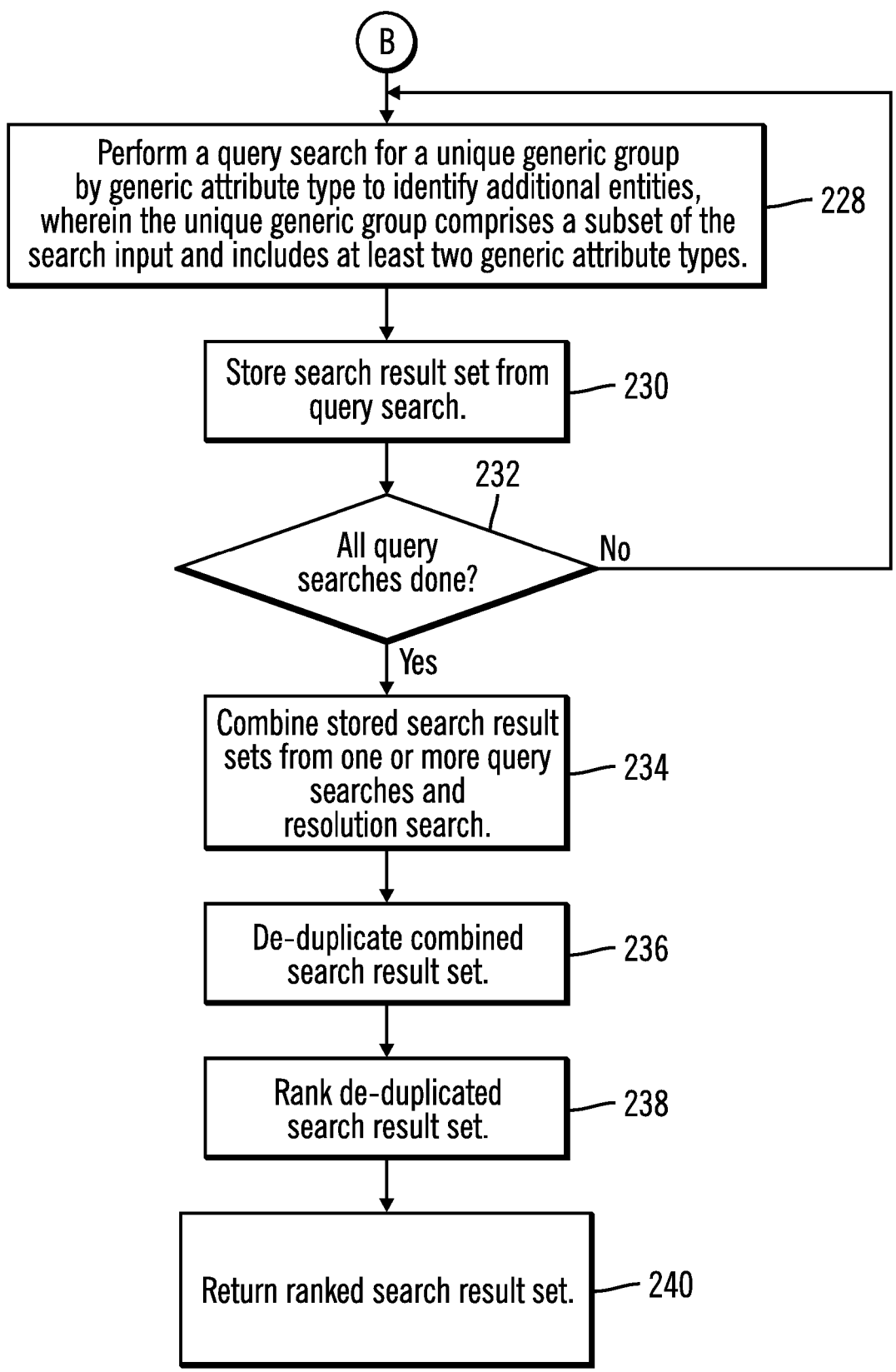

FIGS. 2A, 2B, and 2C illustrate logic, in a flow diagram, for processing search input to generate a search result set. Control begins at block 200 with the combined search system 110 receiving search input. The search input is made up of one or more attribute values (corresponding to attributes) of one or more attribute types. Each of the attribute values may be generic or non-generic. In certain embodiments, the combined search system 110 provides a search screen, and a user provides the search input by entering information into the search screen.

In block 202, the combined search system 110 determines whether the search input indicates a date range. If so processing continues to block 212, otherwise, processing continues to block 204. In block 212, the combined search system 110 performs a query search 130 using the search input. In block 214, the combined search system 110 returns query results from the query search 130.

In block 204, the combined search system 110 determines whether the search input indicates a strict search. If so, processing continues to block 212, otherwise, processing continues to block 206.

In block 206, the combined search system 110 determines whether the search input indicates one or more wildcards. If so, processing continues to block 212, otherwise, processing continues to block 208.

In block 208, the combined search system 110 determines whether the search input indicates one or more incomplete attribute values (i.e., a partial attribute value in the search input, such that the combined search system 110 lacks the sufficient attribute values to create a candidate key; e.g., a first name without a last name for an attribute type of name). If so, processing continues to block 212, otherwise, processing continues to block 210.

In block 210, the combined search system 110 determines whether the search input indicates a single attribute value. If so, processing continues to block 212, otherwise, processing continues to block 216 (FIG. 2B).

In block 216, the combined search system 110 performs a resolution search 120 to generate a search result set (of candidate entities) and zero or more generic attribute values for generating entities. In certain embodiments, the resolution search 120 builds candidate keys first using the search input made up of one or more attribute values. Next, the resolution search 120 removes prior known generic candidate keys from the candidate keys. Then, the resolution search 120 queries the data store 150 with the remaining candidate keys to get candidate entities. In this process, the resolution search 120 may discover new generic candidate keys. Once the resolution search 120 has candidate entities (which are associated with records in the data store 150), the resolution search 120 extracts the records from the data store 150 and compares and scores the records of the candidate entities to the search input that is being processed. This is referred to as a confirmation phase.

Because of the confirmation phase in which the records are retrieved and compared and scored, if there is one generic candidate key, the resolution search 120 may still find one or more records. For example, if the search attributes included a generic name, but a non-generic address, a record with the address would be a candidate entity and the name would be scored in confirmation even though it is generic. Because of this, the resolution search 120 is able to generate a search result set with a single generic candidate key.

In certain embodiments, the resolution search 120 retrieves candidate entities for any non-generic candidate keys (i.e., for the candidate keys that are identified as non-generic or not frequently found among the entities); performs similarity scoring of the candidate entities against the search input to determine a similarity score for each of the candidate entities; and, in response to a similarity score of a candidate entity exceeding a defined threshold, includes that candidate entity in the search result set.

In block 218, the combined search system 110 determines whether the resolution search generated one or more generic candidate keys. If so, processing continues to block 220, otherwise, processing continues to block 226. In block 226, the combined search system 110 returns a search result set generated from the resolution search 120. The search result set includes entities. In particular, when candidate entities are identified to be added to the search result set, those "candidate entities" become entities.

In block 220, the combined search system 110 stores (e.g., caches) the search result set from the resolution search 120. In block 222, the combined search system 110 counts the number of generic attribute values. In certain embodiments, a name (first and last, at least) and a Date of Birth (DOB) are considered generic. In certain embodiments, other identifying characteristics may be considered generic.

In block 224, the combined search system 110 determines whether there is one generic attribute value. If so, processing continues to block 226, otherwise, processing continues to block 228 (FIG. 2C).

In block 228, the combined search system 110 performs a query search 130 for a unique generic group by generic attribute type to identify the additional candidate entities, wherein the unique generic group comprises a subset of the search input and includes at least two generic attribute types.

In certain embodiments, the generic attribute types include name, address, each number type, DOB, and any attribute type identified as an identifying characteristic (IC). An identifying characteristic may be described as a feature that may be used to locate a small group of entities. For example, a DOB does a reasonable job of finding a small group of people. An eyeglass prescription may be another identifying characteristic. On the other hand, gender or marital status alone may not be helpful to identify someone from a group of people. Each unique generic group includes two or more attribute types, with each instance of an attribute type being joined to other instances of a different attribute type by an "OR" operator.

In block 230, the combined search system 110 stores (e.g., caches) the search result set from the query search 130. In block 232, the combined search system 110 determines whether all query searches 130 are done. If so, processing continues to block 234, otherwise, processing loops back to block 228 to perform another query search 130 for another unique generic group.

In block 234, the combined search system 110 combines the stored search result sets from the one or more query searches 130 and the resolution search 120. In block 236, the combined search system 110 de-duplicates the combined search result set (i.e., removes duplicates). In block 238, the combined search system 110 ranks the de-duplicated search result set. In certain embodiments, the candidate entities in the search result set from the resolution search 120 are ranked higher than the candidate entities in the search result sets from the one or more query searches 130. In block 240, the combined search system 110 returns the ranked search result set.

In certain embodiments, the combined search system 110 searches for entities in an entity resolution system. The combined search system 110 receives search input in the form of a plurality of attribute values of one or more attribute types. In response to receiving the search input, the combined search system 110 determines whether performing a query search 130 according to exact and wildcard matches would be optimal. In response to a determination that such a query search 130 would be optimal, the combined search system 110 performs the query search 130 based on exact and wildcard matches and returns a set of found entities as the search result set.

In response to a determination that a query search 130 would not be optimal, the combined search system 110 performs a resolution search 120 by creating candidate keys for generating lists of candidate entities from the search input, determining which of the candidate keys are overly common and should be considered generic, retrieving candidate entities for those candidate keys deemed to be non-generic, and performing similarity scoring of each candidate entity against the search input to determine a similarity score for each entity. In response to an entity's similarity score exceeding a defined threshold, the combined search system 110 includes that entity in the search result set. Further, in response to the existence of at least one generic candidate key, the combined search system 110 performs a subsequent query search 130 with a subset of the specified search input including at least one of the generic candidate keys and includes the matching entities in the search result set. Thus, the combined search system 110 returns a union of the found entities as the search result set.

In certain embodiments, the combined search system 110 1, determines that a query search 130 would be optimal in response to receiving an explicit indication to perform a strict search.

In certain embodiments, the determination that a query search 130 would be optimal is made in response to receiving one or more wildcard input in the search input.

In certain embodiments, the determination that a query search 130 would be optimal is made in response to receiving at least one incomplete attribute values (i.e., a partial attribute value in the search input, such that it lacks the sufficient fields to create a candidate key).

In certain embodiments, the determination that a query search 130 would be optimal is made in response to receiving only one search input attribute value.

In certain embodiments, the determination that a candidate key for an attribute value is generic is made in response to the number of occurrences of that candidate key in the search space exceeding a defined threshold.

In certain embodiments, the determination that a candidate key for an attribute value is generic is made in response to the attribute type being in a defined set of attribute types that are considered to be generic.

In certain embodiments, the subsequent query search 130 is made in response to existence of two or more generic candidate keys (generated from two or more generic attribute values), and the subset of specified search input is formed as combinatorial pairs of those candidate keys determined to be generic.

In certain embodiments, the combined search system 110 provides a search screen. The combined search system 110 enables resolution search 120 and query search 130 in different combinations based on the search input provided via the search screen and the search results produced by individual searches.

FIG. 3 illustrates a search screen 300 in accordance with certain embodiments. The search screen 300 includes a selection choice of a strict search checkbox 310 so that a user can check a box to match all or any criteria in certain embodiments. When a user checks the strict search checkbox, then the combined search system 110 provides searches that match all criteria with the same rules that query search 130 performs. In FIG. 3, the strict search checkbox 310 has not been selected. When the strict search checkbox 310 is not selected, the combined search system 110 determines whether to perform a combined search or a query search. In certain embodiments, the search screen includes a selection choice of a combined search checkbox, and the user selects the combined search checkbox to results from a single search request that uses both the resolution search 120 and the query search 130.

The search screen 300 also allows a user to select an attribute type, and, when the user selects the attribute type, the combined search system 110 displays fields for search input for the selected attribute type. For example, for attribute type address 320, the combined search system 110 displays address fields 330. A user may then enter search input into the address fields 330. As another example, for attribute type passport 340, the combined search system 110 displays passport fields 350. A user may then enter search input into the passport fields 350.

In the example of FIG. 3, a search on a generic address and a generic passport number is performed. Because the resolution search 120 will not use the generic attribute values to find results, the combined search system 110 runs the query search 130 to find entity search results.

FIGS. 4A, 4B, and 4C illustrate log text 400, 410, 420 for processing performed by the combined search system 110 on the search input provided in FIG. 3.

FIG. 5 illustrates search results 500 in the search screen 300 in accordance with certain embodiments. In certain embodiments, when the search results are displayed, the combined search system 110 provides additional data (i.e., in addition to the entity information). The additional data includes a list of generic values that were includes in the search input. With reference to FIG. 5, the generic values include the passport number 510 and the address 520.

In certain alternative embodiments, the combined search system 110 executes the resolution search 120 and displays search results with any generic values.

Figure 6:
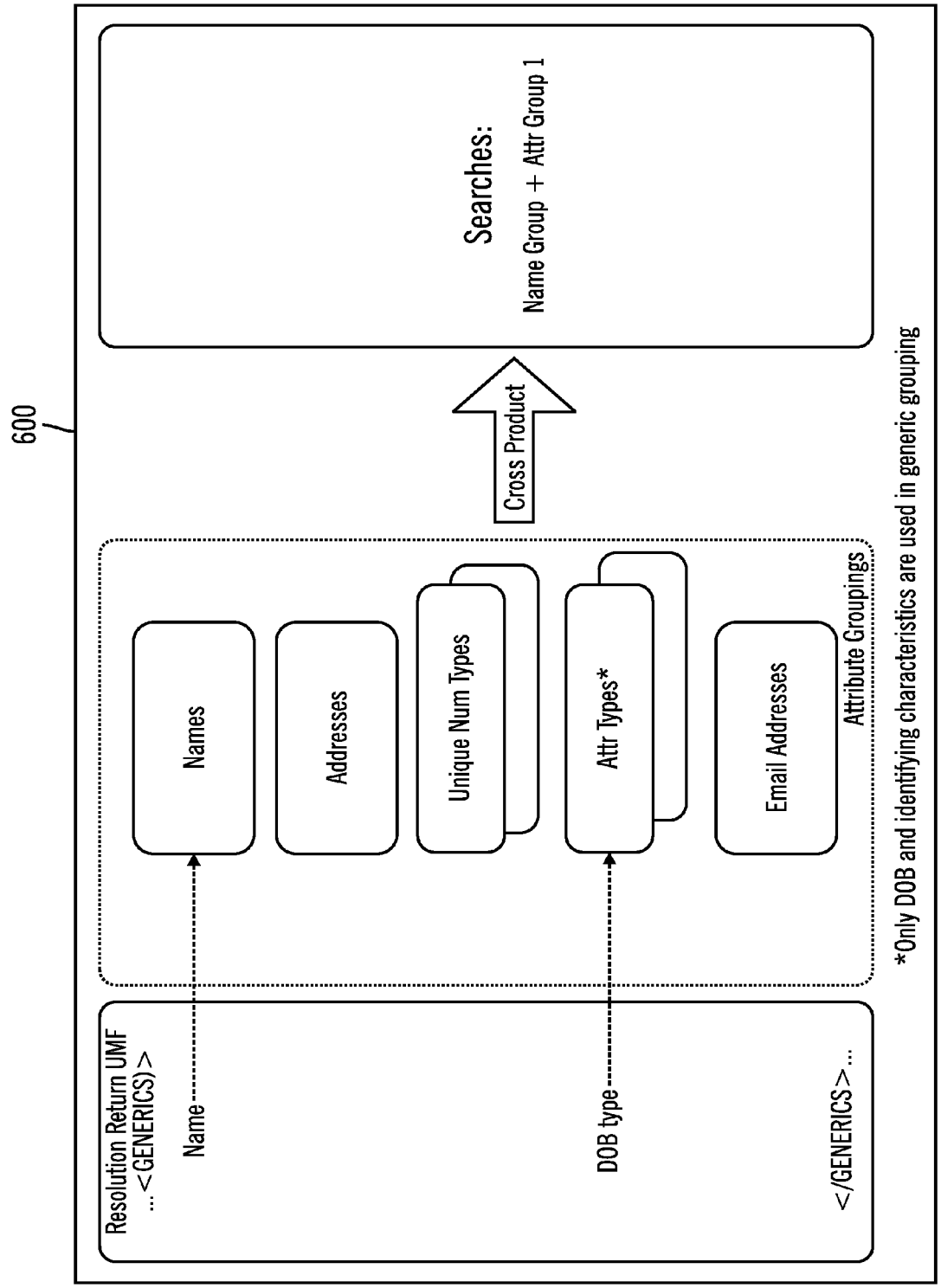
FIG. 6 illustrates a first example search in accordance with certain embodiments.

FIG. 6 illustrates a first example search 600 in accordance with certain embodiments. In this case, a resolution search result contained a generic NAME and a DOB was part of the search input. In certain embodiments, DOB is treated as generic for all searches because there are not enough distinct values of DOBs. Since the DOB is treated as a generic, the combined search system 110 performs a search of the name and the DOB using the query search 130. The results of this query search 130 are combined with (i.e., added to) any existing results from the resolution search 120. In FIGS. 6-9, a Universal Message Format (UMF) is used.

Figure 7:
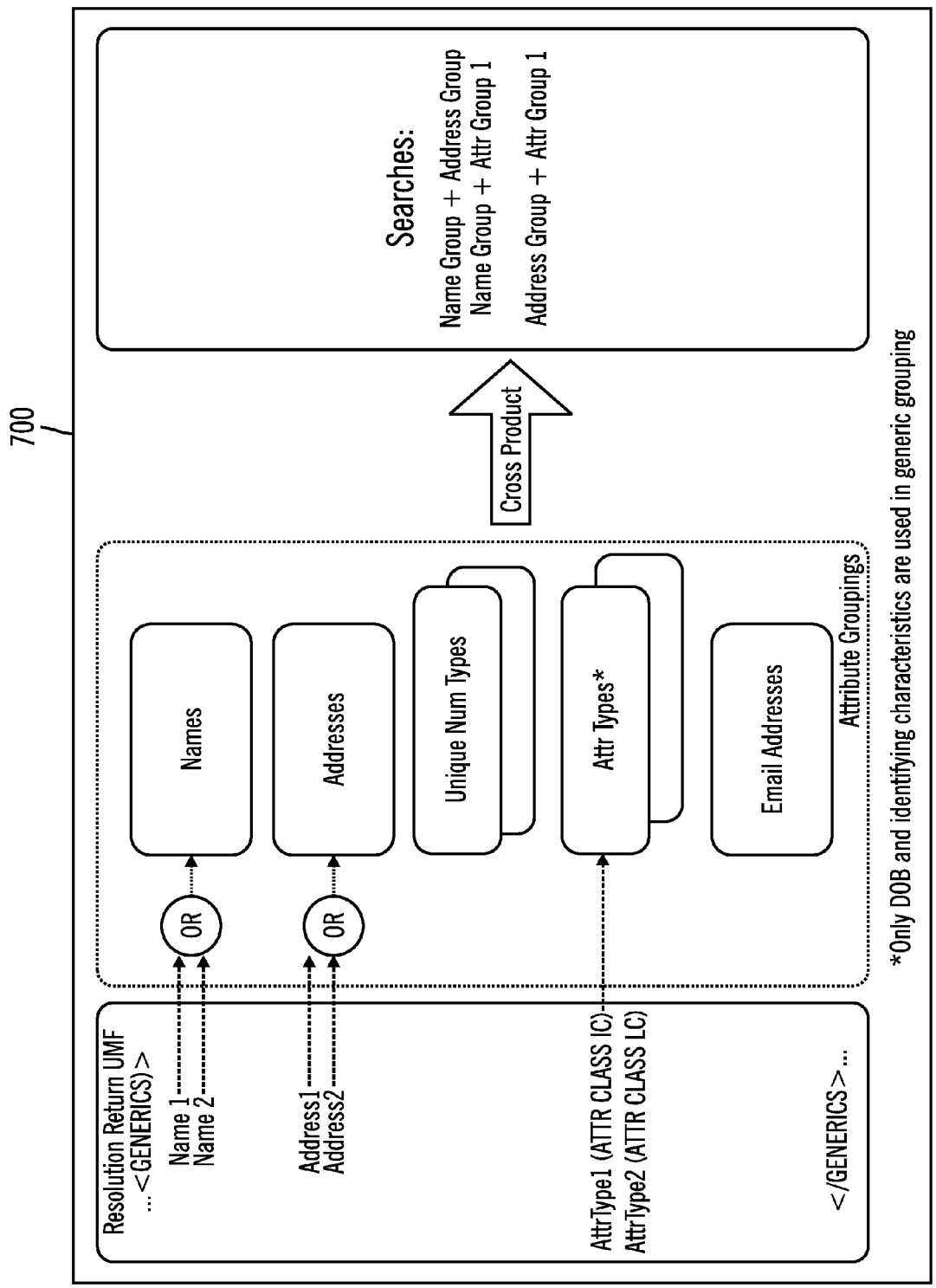
FIG. 7 illustrates a second example search in accordance with certain embodiments.

FIG. 7 illustrates a second example search 700 in accordance with certain embodiments. In this case, a resolution search result contained two generic name attribute values, two generic address attribute values, and one generic identifying characteristic attribute type. The two generic names are added to the Names attribute group (since the query search 130 adds an "OR" operator within attribute groups), the two generic address are added to the Address attribute group, and the generic identifying characteristic attribute is added to the Attribute Types attribute group (due to the identifying characteristic attribute class). The combined search system 110 performs a cross-product search on an attribute group level (i.e., each combination of attribute group). The results of this query search 130 are combined with (i.e., added to) any existing resolution search results.

Figure 8:
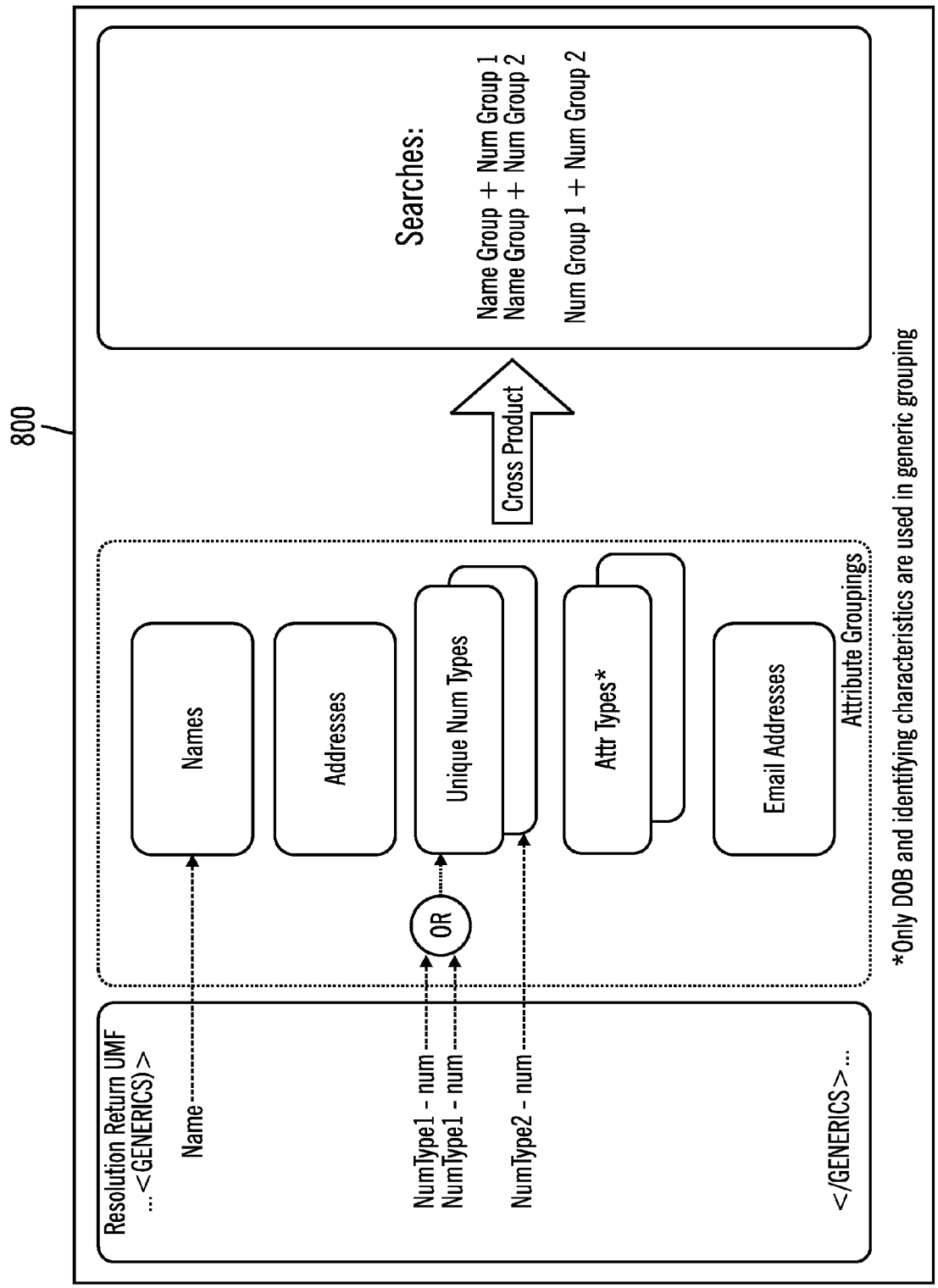
FIG. 8 illustrates a third example search in accordance with certain embodiments.

FIG. 8 illustrates a third example search 800 in accordance with certain embodiments. In this case, a resolution search result contained a generic NAME, two generic numbers of the same type, and one generic number of a second type. The generic name is added to the Name attribute group. Since each number type is considered a separate attribute group, the first two numbers (since they are the same type) are added to one number group, and the third number (of a different type) is added to a second number group. The combined search system 110 performs a cross-product search on an attribute group level (i.e., each combination of attribute group). The results of this query search 130 are combined with (i.e., added to) any existing resolution search results.

Figure 9:
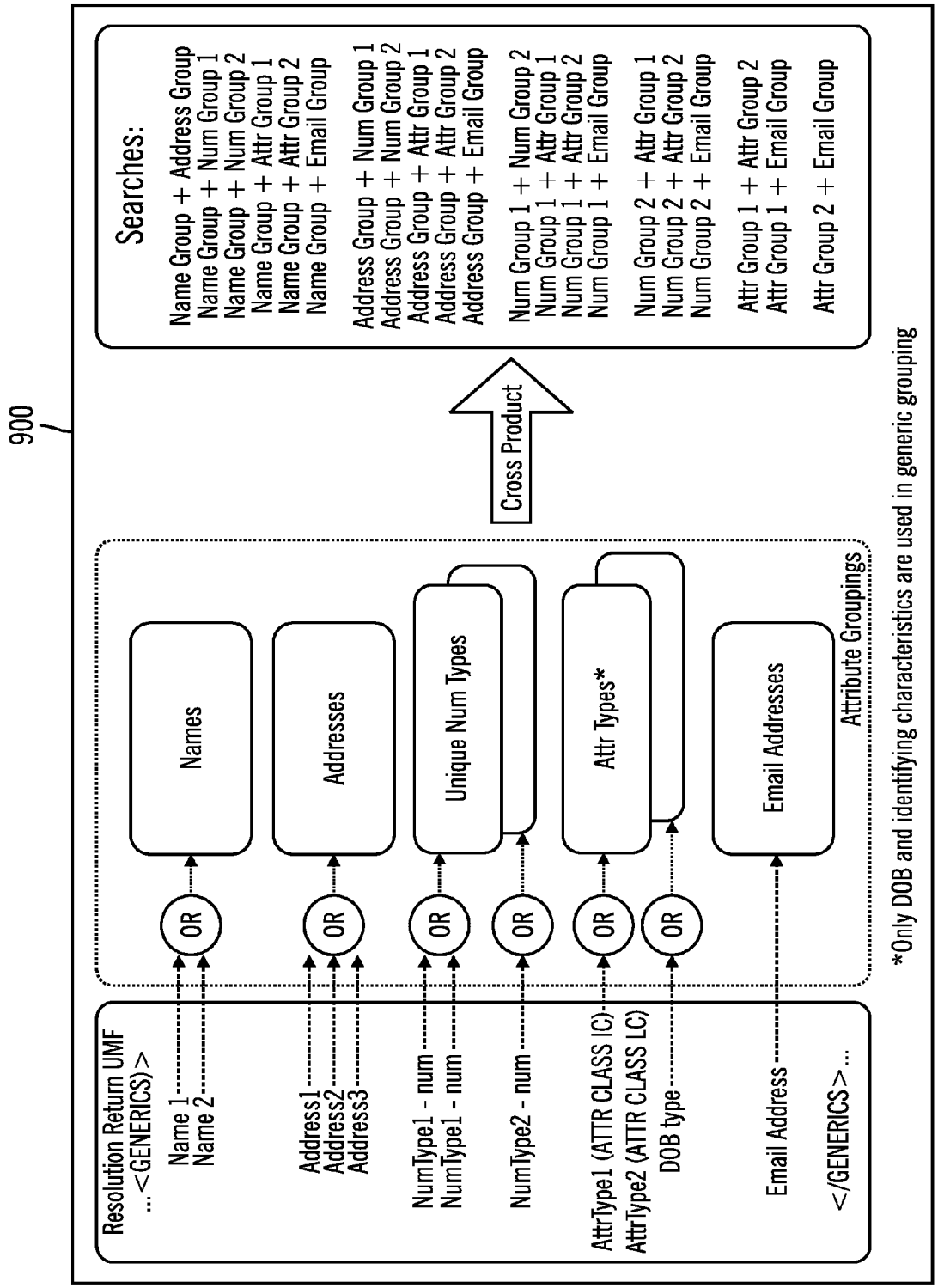
FIG. 9 illustrates a fourth example search in accordance with certain embodiments.

FIG. 9 illustrates a fourth example search 900 in accordance with certain embodiments. In this example search, names, addresses, different number types, an identifying characteristic attribute type, a DOB, and an email address are identified as generic. The names are added to a name group, the addresses are added to an address group, each number type gets a unique number group, each identifying characteristic attribute gets a unique attribute group, the DOB gets a unique attribute group, and the email address is added to an email address group. The combined search system 110 performs a cross-product search on an attribute group level (i.e., each combination of attribute group). The results of this query search 130 are combined with (i.e., added to) any existing resolution search results.

The combined search system 110 provides an automatic way to merge a strict search (i.e., a query search) with search results generated through entity resolution processing of a hypothetical identity record. The combined search system 110 determines early-on whether a resolution search 120 is possible. If not, the combined search system 110 defaults to the query search 130, otherwise, the combined search system 110 uses a resolution search 120 to drive the search, which may in turn fall back to a query search 130 for a subset of the search input, which are generic (e.g., with name+DOB+any other attribute types found to be generic).

In particular, if a data range has been provided, a strict search checkbox has been selected, any wildcard has been provided, one or more incomplete attribute values (e.g., only a last name is provided for an attribute type of name, only a zip code is provided for an attribute type of address, etc.) are provided, or a single attribute value is provided, then the combined search system 110 runs a query search 130.

For other searches, the combined search system 110 performs the resolution search 120 with all data. If no generics (i.e., over frequently used keys) are returned, then the combined search system 110 returns results from the resolution search 120, otherwise, the combined search system 110 check to see whether there are generic attribute values (e.g., name or DOB). If one generic attribute value is found, then the combined search system 110 returns results from the resolution search 120, otherwise, the combined search system 110 runs one or more query searches for the at least two generic attribute values. The query searches may include any pairing of generic attribute values. In certain embodiments, the name and DOB are paired together with a third generic attribute value (e.g., generic attribute+name+DOB).

If both search types were executed, the combined search system 110 combines and de-duplicates the results by entity ID, ranks the results, and returns these results.

The following illustrates a first use case in accordance with certain embodiments:
Search Attributes: Name
Searches Run: query search 130 on Name
Justification: The query search 130 on names returns same search results as resolution search 120

The following illustrates a second use case in accordance with certain embodiments:
Search Attributes: Phone Number
Searches Run: query search on Phone Number
Justification: The query search 130 on Phone Number returns same search results as resolution search 120.

The following illustrates a third use case in accordance with certain embodiments:
Search Attributes: Address
Searches Run: query search 130 on Address
Justification: The query search 130 on Address returns same search results as resolution search 120.

The following illustrates a fourth use case in accordance with certain embodiments:
Search Attributes: DOB
Searches Run: query search 130 on Attribute
Justification: The query search 130 on attribute returns values, while resolution search 120 would find DOB to be generic and not return any values.

The following illustrates a fifth use case in accordance with certain embodiments:
Search Attributes: Name, Address
Searches Run: resolution search 120
Generics Returned: None
Justification: The resolution search 120 returns search results with no generics.

The following illustrates a sixth use case in accordance with certain embodiments:
Search Attributes: Name, Phone
Searches Run: resolution search 120
Generics Returned: None
Justification: The resolution search 120 returns search results with no generics.

The following illustrates a seventh use case in accordance with certain embodiments:
Search Attributes: Name, DOB
Searches Run: resolution search 120
Generics Returned: DOB
Justification: The resolution search 120 returns search results on name. All candidates are fully scored on DOB. That is, when records are returned with the name matched, the DOB is used to help score each record as a match or no match. There is no need to find people with the DOB to score the name because the combination search 110 already has them. The combination search 110 is looking for 2 search attribute gaps.

The following illustrates a eighth use case in accordance with certain embodiments:
Search Attributes: Name, Phone
Generics Returned: Name
Searches Run: resolution search 120
Justification: The resolution search 120 returns all search results when only one generic (Name), and data with both search attributes is already returned by the resolution search 120. If there is one generic, We the combination search 110 scores all the data. The combination search 110 is looking for 2 elements matching for best results. If there is one generic, there is no hole to fill. That is, the combination search 110 finds all the candidates with 2 element matches because there is one generic and the combination search 110 picks up the generic value in confirmation scoring.

The following illustrates a ninth use case in accordance with certain embodiments:
Search Attributes: Name, Phone
Generics Returned: Phone
Searches Run: resolution search 120
Justification: The resolution search 120 returns all search results when only one generic (Phone), and data with both search attributes is already returned.

The following illustrates a tenth use case in accordance with certain embodiments:
Search Attributes: Name, Address
Generics Returned: Name
Searches Run: resolution search 120
Justification: The resolution search 120 returns all search results when only one generic (Name), and data with both search attributes is already returned.

The following illustrates a eleventh use case in accordance with certain embodiments:
Search Attributes: Name, Address
Generics Returned: Address
Searches Run: resolution search 120
Justification: The resolution search 120 returns all results when only one generic (Address), and data with both search attributes is already is returned.

The following illustrates a twelfth use case in accordance with certain embodiments:
Search Attributes: Name, DOB
Generics Returned: Name
Searches Run: resolution search 120, query search on Name+DOB
Justification: The resolution search 120 returns nothing because there are no candidate generators, and the query search 130 is run as there are two generics (note that DOB is considered generic).

The following illustrates a thirteenth use case in accordance with certain embodiments:

Search Attributes: Name, Address, Phone
Generics Returned: Name, Address
Searches Run: resolution search 120, query search 130 on Name+Address
Justification: The resolution search 120 returns phone matches, and the Name and Address query search 130 executes other combination The following illustrates a fourteenth use case in accordance with certain embodiments:
Search Attributes: Name, Address, Phone
Generics Returned: Name, Phone
Searches Run: resolution search 120, query search 130 on Name+Phone
Justification: The resolution search 120 returns phone matches, and the Name and Phone query search 130 executes other combination.

The following illustrates a fifteenth use case in accordance with certain embodiments:
Search Attributes: Name, Address, Phone
Generics Returned: Phone, Address
Searches Run: resolution search 120, query search 130 on Phone+Address
Justification: The resolution search 130 returns Name only matches, and the Phone and Address query search 130 executes other high value combinations.

The following illustrates a sixteenth use case in accordance with certain embodiments:
Search Attributes: Name, Address, Phone
Generics Returned: Name, Address, Phone
Searches Run: resolution search 120, query search 130 on Name+Address, query search 130 on Name+Phone, query search 130 on Address+Phone
Justification: The resolution search 120 returns nothing, and the query searches 130 match resolution rules and high quality 2 part match. That is, to resolve a search to a record, it typically takes at least 2 search attributes. So, a record matching both a NAME and a SSN would have a strong likelihood that people are the same. Name and Address is another. For example, a record matching both Address and Phone is a little less likely that they are the same person, but the found person may know the right person (e.g., could be a spouse or a roommate). Thus, the resolution rules start with at least 2 search attributes matching, and that is why generic values are paired up to find the entity (e.g., person).

The following illustrates a seventeenth use case in accordance with certain embodiments:
Search Attributes: Name, Address, DOB
Generics Returned: Name
Searches Run: resolution search 120, query search 130 on Name+DOB
Justification: The resolution search 120 returns most results, and the query search 130 match a resolution rule Name+DOB.

The following illustrates a eighteenth use case in accordance with certain embodiments:
Search Attributes: Name, Address, DOB
Generics Returned: Address
Searches Run: resolution search 120, query search 130 on Address+DOB
Justification: The resolution search 120 returns most results, and the query search 130 matches high quality two part matches.

The following illustrates a nineteenth use case in accordance with certain embodiments:
Search Attributes: Name, Address, DOB
Generics Returned: Name, Address
Searches Run: resolution search 120, query search 130 on Name+DOB, query search 130 on Name+Address, query search 130 on Address+DOB
Justification: The resolution search 120 returns nothing, and the query searches 130 return any two item matches.

The following illustrates a twentieth use case in accordance with certain embodiments:
Search Attributes: Name, Phone, DOB
Generics Returned: Name
Searches Run: resolution search 120, query search 130 on Name+DOB
Justification: The resolution search 120 returns most results, and the query search 130 match resolution rule name+DOB.

The following illustrates a twenty-first use case in accordance with certain embodiments:
Search Attributes: Name, Phone, DOB
Generics Returned: Phone
Searches Run: resolution search 120, query search 130 on Phone+DOB
Justification: The resolution search 120 returns most results, and the query search 130 matches high quality two part matches.

The following illustrates a twenty-second use case in accordance with certain embodiments:
Search Attributes: Name, Phone, DOB
Generics Returned: Name, Phone
Searches Run: resolution search 120, query search 130 on Name+DOB, query search 130 on Name+Phone, query search 130 on Phone+DOB
Justification: The resolution search 120 returns nothing, and the query searches 130 return any two item matches.

The following illustrates a twenty-third use case in accordance with certain embodiments:
Search Attributes: Name, Address, Phone, DOB
Generics Returned: Name
Searches Run: resolution search 120, query search 130 on Name+DOB
Justification: The resolution search 120 returns most results, and the query search 130 returns two element matches.

The following illustrates a twenty-fourth use case in accordance with certain embodiments:
Search Attributes: Name, Address, Phone, DOB
Generics Returned: Phone
Searches Run: resolution search 120, query search 130 on Phone+DOB
Justification: The resolution search 120 returns most results, and the query search 130 returns two element matches.

The following illustrates a twenty-fifth use case in accordance with certain embodiments:
Search Attributes: Name, Address, Phone, DOB
Generics Returned: Name, Address
Searches Run: resolution search 120, query search 130 on Name+DOB, query search 130 on Address+DOB, query search 130 on Name+Address
Justification: The resolution search 120 returns most results, and the query searches 130 return all two part matches.

The following illustrates a twenty-sixth use case in accordance with certain embodiments:
Search Attributes: Name, Address, Phone, DOB
Generics Returned: Name, Phone
Searches Run: resolution search 120, query search 130 on Name+DOB, query search 130 on Phone+DOB, query search 130 on Name+Phone Justification: The resolution search 120 returns most results, and the query searches 130 return all two part matches.

The following illustrates a twenty-seventh use case in accordance with certain embodiments:
Search Attributes: Name, Address, Phone, DOB
Generics Returned: Phone, Address
Searches Run: resolution search 120, query search 130 on Phone+DOB, query search 130 on Address+DOB, query search 130 on Phone+Address
Justification: The resolution search 120 returns most results, and the query searches 130 return all two part matches.

The following illustrates a twenty-eighth use case in accordance with certain embodiments:
Search Attributes: Name, Address, Phone, DOB
Generics Returned: Name, Phone, Address
Searches Run: resolution search 120, query search 130 on Name+DOB, query search 130 on Name+Phone, query search 130 on Name+Address, query search 130 on Phone+Address, query search 130 on Phone+DOB, query search 130 on Address+DOB
Justification: The resolution search 120 returns most results, and the query searches 130 return all two part matches.

The following illustrates a twenty-ninth use case in accordance with certain embodiments:
Search Attributes: Name, Phone (2 of them), DOB
Generics Returned: Name, Phone (1 of the 2)
Searches Run: resolution search 120, query search 130 on Name+DOB, query search 130 on Name+Phone (1), query search 130 on Phone (1)+DOB,
Justification: The resolution search 120 returns most results, and the query searches 130 return all two part matches, where only one phone number needs to match.

The following illustrates a thirtieth use case in accordance with certain embodiments:
Search Attributes: Name, Phone (2 of them), DOB
Generics Returned: Name, Phone (2 of the 2)
Searches Run: resolution search 120, query search 130 on Name+DOB, query search 130 on Name+Phone+Phone, query search 130 on Phone+Phone+DOB
Justification: The resolution search 120 returns most results, and the query searches 130 return (either phone 1 or phone 2)+other matching component.

Thus, the combined search system 110 returns proper and limited search results to search input, even in the presence of generic attribute values, which occur frequently in the entity resolution system. That is, the combined search system 110 is able to process over-frequent search input terms.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 10:
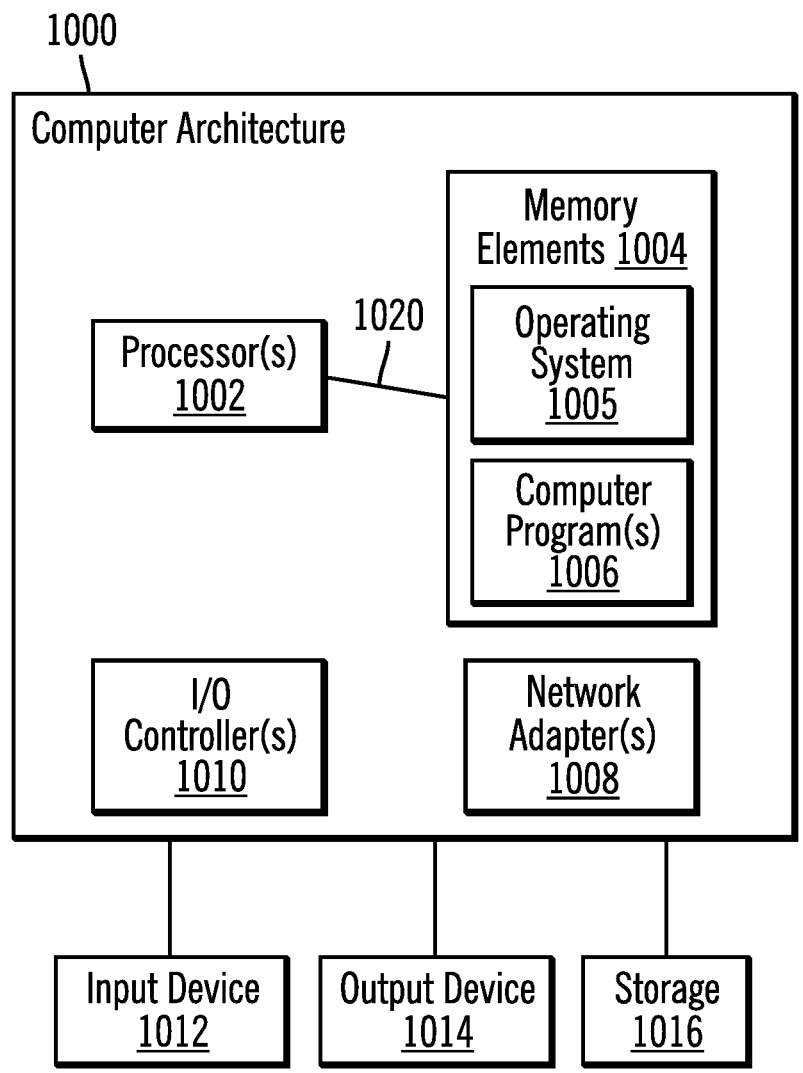
FIG. 10 illustrates, in a block diagram, a computer architecture that may be used in accordance with certain embodiments.

FIG. 10 illustrates a computer architecture 1000 that may be used in accordance with certain embodiments. Computing device 100 may implement computer architecture 1000. The computer architecture 1000 is suitable for storing and/or executing program code and includes at least one processor 1002 coupled directly or indirectly to memory elements 1004 through a system bus 1020. The memory elements 1004 may include local memory employed during actual execution of the program code, bulk storage, and cache memories which provide temporary storage of at least some program code in order to reduce the number of times code must be retrieved from bulk storage during execution. The memory elements 1004 include an operating system 1005 and one or more computer programs 1006.

Input/Output (I/O) devices 1012, 1014 (including but not limited to keyboards, displays, pointing devices, etc.) may be coupled to the system either directly or through intervening I/O controllers 1010.

Network adapters 1008 may also be coupled to the system to enable the data processing system to become coupled to other data processing systems or remote printers or storage devices through intervening private or public networks. Modems, cable modem and Ethernet cards are just a few of the currently available types of network adapters 1008.

The computer architecture 1000 may be coupled to storage 1016 (e.g., a non-volatile storage area, such as magnetic disk drives, optical disk drives, a tape drive, etc.). The storage 1016 may comprise an internal storage device or an attached or network accessible storage. Computer programs 1006 in storage 1016 may be loaded into the memory elements 1004 and executed by a processor 1002 in a manner known in the art.

The computer architecture 1000 may include fewer components than illustrated, additional components not illustrated herein, or some combination of the components illustrated and additional components. The computer architecture 1000 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method to search for an entity in an entity resolution system, comprising:
   receiving, using a processor of a computer, search input made up of attributes having attribute types;
   performing a resolution search using the search input to generate a first search result set comprising one or more entities and zero or more generic attributes, wherein the resolution search determines that the search input and each of the one or more entities has a similarity score exceeding a first threshold, and wherein each of the generic attributes has a frequency of occurrence exceeding a second threshold;

in response to determining that the resolution search generated less than two generic attributes, returning the first search result set; and in response to determining that the resolution search generated at least two generic attributes, for each generic group that includes a subset of the search input and includes at least two generic attribute types from the attribute types of attributes in the search input, performing a query search to identify additional entities;

combining the identified additional entities with the entities in the first search result set to generate a second search result set; and returning the second search result set.

2. The method of claim 1, further comprising:

in response to receiving the search input, determining whether to perform the query search based on the search input; and in response to determining that the query search is to be performed, performing the query search.

3. The method of claim 2, wherein it is determined to perform the query search when the search input comprises at least one of a date range, a wildcard, and an incomplete attribute value.

4. The method of claim 2, wherein it is determined to perform the query search in response to receiving an explicit indication to perform a strict search.

5. The method of claim 2, wherein it is determined to perform the query search when the search input comprises a single attribute value.

6. The method of claim 1, further comprising:

determining whether to perform the resolution search; and in response to determining that the resolution search is to be performed, performing the resolution search.

7. The method of claim 1, wherein the resolution search further comprises:

removing generic candidate keys;

retrieving one or more candidate entities for non-generic candidate keys;

performing similarity scoring of the candidate entities against the search input to determine a similarity score for each of the candidate entities; and for each of the candidate entities, in response to a similarity score of that candidate entity exceeding the first threshold, including that candidate entity as an entity in the first search result set.

8. The method of claim 1, further comprising:

de-duplicating the second search result set; and ranking search results in the second search result set.

9. A computer system for an entity in an entity resolution system, comprising:

a processor; and a storage device connected to the processor, wherein the storage device has stored thereon a program, and wherein the processor is configured to execute instructions of the program to perform operations, wherein the operations comprise:

receiving search input made up of attributes having attribute types;

performing a resolution search using the search input to generate a first search result set comprising one or more entities and zero or more generic attribute values, wherein the resolution search determines that the search input and each of the one or more entities has a similarity score exceeding a first threshold, and wherein each of the generic attributes has a frequency of occurrence exceeding a second threshold;

in response to determining that the resolution search generated less than two generic attributes, returning the first search result set; and in response to determining that the resolution search generated at least two generic attributes, for each generic group that includes a subset of the search input and includes at least two generic attribute types from the attribute types of attributes in the search input, performing a query search to identify additional entities;

combining the identified additional entities with the entities in the first search result set to generate a second search result set; and returning the second search result set.

10. The system of claim 9, wherein the operations further comprise:

in response to receiving the search input, determining whether to perform the query search based on the search input; and in response to determining that the query search is to be performed, performing the query search.

11. The system of claim 10, wherein it is determined to perform the query search when the search input comprises at least one of a date range, a wildcard, and an incomplete attribute value.

12. The system of claim 10, wherein it is determined to perform the query search in response to receiving an explicit indication to perform a strict search.

13. The system of claim 10, wherein it is determined to perform the query search when the search input comprises a single attribute value.

14. The system of claim 9, wherein the operations further comprise:

determining whether to perform the resolution search; and in response to determining that the resolution search is to be performed, performing the resolution search.

15. The system of claim 9, wherein the operations for the resolution search further comprise:

removing generic candidate keys;

retrieving one or more candidate entities for non-generic candidate keys;

performing similarity scoring of the candidate entities against the search input to determine a similarity score for each of the candidate entities; and for each of the candidate entities, in response to a similarity score of that candidate entity exceeding the first threshold, including that candidate entity as an entity in the first search result set.

16. A computer program product for an entity in an entity resolution system, the computer program product comprising:

a computer readable storage medium having computer readable program code embodied therewith, the computer readable program code comprising:

computer readable program code, when executed by a processor of a computer, configured to perform:

receiving search input made up of attributes having attribute types;

performing a resolution search using the search input to generate a first search result set comprising one or more entities and zero or more generic attributes, wherein the resolution search determines that the search input and each of the one or more entities has a similarity score exceeding a first threshold, and wherein each of the generic attributes has a frequency of occurrence exceeding a second threshold; in response to determining that the resolution search generated less than two generic attributes, returning the first search result set; and in response to determining that the resolution search generated at least two generic attributes,
- for each generic group that includes a subset of the search input and includes at least two generic attribute types from the attribute types of attributes in the search input, performing a query search to identify additional entities;
- combining the identified additional entities with the entities in the first search result set to generate a second search result set; and
- returning the second search result set.

17. The computer program product of claim 16, wherein the computer readable program code, when executed by the processor of the computer, is configured to perform:
in response to receiving the search input,
- determining whether to perform the query search based on the search input; and
- in response to determining that the query search is to be performed, performing the query search.

18. The computer program product of claim 17, wherein it is determined to perform the query search when the search input comprises at least one of a date range, a wildcard, and an incomplete attribute value.

19. The computer program product of claim 17, wherein it is determined to perform the query search in response to receiving an explicit indication to perform a strict search.

20. The computer program product of claim 17, wherein it is determined to perform the query search when the search input comprises a single attribute value.

21. The computer program product of claim 16, wherein, for the resolution search, the computer readable program code, when executed by the processor of the computer, is configured to perform:
- determining whether to perform the resolution search; and
- in response to determining that the resolution search is to be performed, performing the resolution search.

22. The computer program product of claim 16, wherein the computer readable program code, when executed by the processor of the computer, is configured to perform:
- removing generic candidate keys;
- retrieving one or more candidate entities for non-generic candidate keys;
- performing similarity scoring of the candidate entities against the search input to determine a similarity score for each of the candidate entities; and
- for each of the candidate entities, in response to a similarity score of that candidate entity exceeding the first threshold, including that candidate entity as an entity in the first search result set.

* * * * *